July 26, 1932.    A. LANGER    1,868,666
EXTRACTING OF IRON
Filed July 19, 1929
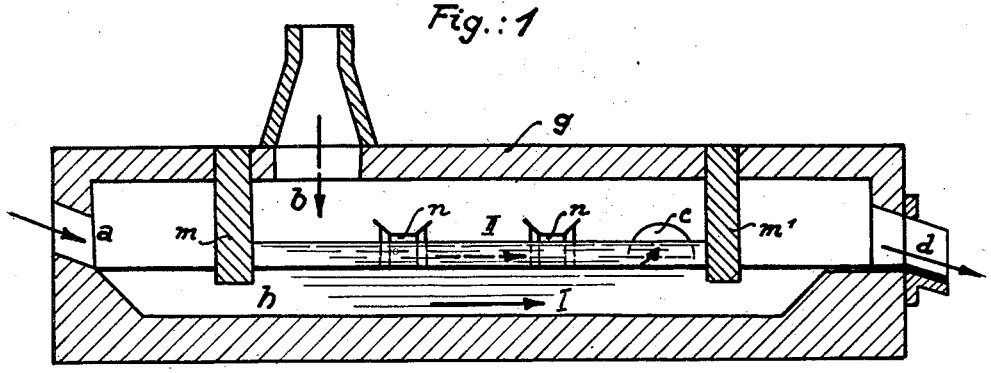
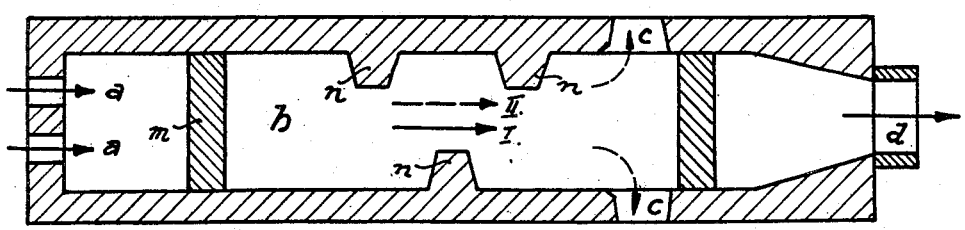

Patented July 26, 1932

1,868,666

UNITED STATES PATENT OFFICE

ARTHUR LANGER, OF VIENNA, AUSTRIA

EXTRACTING OF IRON

Application filed July 19, 1929, Serial No. 379,587, and in Austria May 3, 1929.

The present invention relates to a process for the direct extraction of iron from its ores and to a furnace for carrying out the said process.

It has already been proposed to employ a process for the extraction of iron from its ores by the action of a reducing agent in an iron bath, wherein the ore is introduced into a continuously flowing iron bath and the two components move continuously in opposite directions to one another, both before and during the reaction of the components with one another. The expression "components" as used in this specification is intended to mean on the one hand a flowing iron bath, and on the other hand, the ore reduction mixture which flows over the former. In this process the constant movement of the components relatively to one another operates in an extremely favourable manner for the working of the process—first, in a mechanical way in consequence of the constant change of contact, further by the heat interchanging action and by the introduction of mixed or dissolved active materials, then again by the rapid removal of exhausted products and finally by catalytic and mass action, as has been set forth in the patent specification Serial No. 353,000, filed April 6th, 1929, relating to the said process, in which it is compared with the previously known processes for the reduction of ores.

The present invention is based on the discovery that for the attainment of the results above set forth, the most important factor is not so much the direction of flow of the components, but the change of the contact of the components, and particularly the frequency of such change of contact, as will be readily understood.

The principal object of the present invention is to provide an improvement on the aforesaid known process by substituting for the true counter current principle a flowing motion of the two components of the bath relatively to one another in any desired direction, the individual directions of flow being inclined to one another at any desired angle or being even in the same direction but at different velocities. The following examples will serve as a comparison of the two processes:

When the true counter current principle is employed, i. e. when the directions of flow of the two components of the bath are opposite to one another, a relative velocity is obtained, which is equal to the sum of the two individual velocities, i. e. if, for example, the one component has a velocity of 1 and the other component has a velocity of 3 in the opposite direction, then the relative velocity of the two components with regard to one another will be 1+3=4.

If now, according to the present invention, the components are caused to flow in the same direction, and it is desired to obtain the same relative velocity as in the preceding case with the first component of the bath again moving with a velocity of 1, then the second component of the bath, which now flows in the same direction as the first component, must be caused to flow with a velocity of 5, so that the relative velocity of the components amounts to 5−1, i. e. to 4, as before.

In order to attain this result it is therefore only necessary to increase the velocity of the one component of the bath from 3 to 5.

The difference in the velocity of flow of two components of the bath aimed at according to the present invention necessitates however an alteration of the quantities of the flowing components. It is therefore preferable that at least one of the components of the bath is caused to flow into the bath as an additive ingredient in variable quantities or that the component of the bath which is discharged from the furnace, is introduced again into the latter. As a result of the increase of the bulk of the bath by the addition, a greater velocity is obtained in every part of the furnace, whereby an increased relative movement is caused.

If, by altering the temperature (i. e. the heat content) of the additive component of the bath, or by mixing it with or dissolving it with reducing agents, particular properties advantageous for the working of the process are imparted to the said component, which properties are transmitted to the other component of the bath, then the interchange of heat and of operative agents can be further accelerated according to the invention, by increasing the relative velocity of the components of the bath with regard to one another, as can be effected by means of the above described addition of material to the reduction products already existent in the furnace produced from the raw materials.

It will be understood that the operation of causing the smelted materials to flow repeatedly through the furnace can be applied, not only to one of the components, but may be carried out either with the metallic component or with the slag.

By employing the modified movement of one component with regard to the other components in the aforesaid manner according to the invention, a relative movement is obtained, in spite of the fact that all the materials flow in the same direction, even when their quantities are in a substantially invariable proportion. In spite of the fact that the original quantities remain otherwise the same, the relative velocities and their effects are substantially altered, when the flow through the furnace takes place more frequently and in differing quantities at differing speeds.

The increase of the relative velocities in the furnace by causing products tapped off therefrom to flow repeatedly and continuously through it constitutes an important feature of the present invention, inasmuch as by this means a hitherto unknown finely graduated regulation of the smelting processes can be effected by means of controlled flowing movements.

It is a further object of the invention to obtain the aforesaid favourable effects of the relative movement not only within the liquid layer of the bath, but also between the flowing bath and the gases streaming over it, so that ore suspended in the said gases is reduced by the continuous flowing motion.

The application of the principle of movement in any direction, particularly movement of the components in the same direction, according to the invention, offers the advantage of decreasing the internal resistances to flow and renders it possible to deflect and reverse the direction of flow, so that the furnace can be constructed of U-shape, S-shape or with a plurality of bends, i. e. of serpentine shape.

One method of carrying out the process according to the invention will now be explained by way of example with reference to the accompanying drawing, in which:

Fig. 1 is a vertical longitudinal section through a furnace for carrying out the process, and Fig. 2 is a horizontal section of the furnace corresponding to Fig. 1.

The furnace extends longitudinally and forms a closed hearth space $h$ and an arch $g$.

Both the iron bath and the ore reduction mixture are introduced into the furnace at the same end, the former being introduced at $a$ and the latter at $b$. The possibility of the layer on the surface of the bath flowing towards the left-hand side is prevented by means of a slag baffle $m$. The lighter ore reduction mixture floats on the heavy iron bath and both move in the same direction, namely towards the right-hand side, as indicated by the arrows I, II. The slag and the molten iron are both drawn off at the other end of the hearth, the slag being drawn off at $c$ and the molten iron at $d$. A second baffle $m_1$ is provided which determines the end of the path of the slag. The iron outlet $d$ is located below the level of the iron inlet. The velocity of flow of the iron bath depends upon the quantity of iron introduced into the furnace per unit of time at the left-hand end, and, if desired, the iron bath discharged at the right-hand end can be continuously introduced into the furnace again at the left-hand end. The velocity of the layer floating on the iron bath is lower than that of the latter, inasmuch as the slag is rougher and more viscous than the iron bath located beneath it and is held back by friction on the side walls of the furnace. The velocity at which the slag flows out depends on the size of the slag discharge opening and the quantity of the ore reduction mixture which is continuously introduced into the furnace, and likewise on the temperature of the furnace gases. The velocity of the upper layer can be further diminished by the provision of short transverse baffles $n$ or other retarding members. In consequence of the different velocities of flow of the iron bath and the slag (although the flow takes place in the same direction) a continuous alteration of the points of contact of the two constituents takes place which is of particular importance in the process.

According to the invention the aforesaid favourable flow effects obtained in continuously flowing baths in which the components move relatively to one another may be applied not only to hearth furnaces, but also to other furnaces, particularly to blast furnaces and electrical furnaces, by associating with them a hearth member serving for the flowing operations.

In furnaces of this kind, as is well known, a pool of iron forms in the lowest part at the bottom of the so-called hearth, which pool has to be tapped off from time to time as it collects. The time taken for tapping off, i. e. for the pool to flow out is only comparatively short in comparison with the time taken for the pool to collect, which is generally several hours. During the latter time the iron which is collecting in the furnace hearth remains at rest except for the slight rising of the surface of the bath. Even in blast furnaces having a so-called open baffle hearth, in which the products of smelting flow away from the bottom of the hearth immediately without first collecting there, the operation of flowing out of the furnace only occurs once and takes place at a velocity corresponding to the quantity produced, whereupon the said products remain outside of the furnace, whereby their heat content and the products dissolved in them, which could still operate in the smelting process, are wasted.

The operative factors removed from the furnace are rendered of use in the latter according to the present invention by introducing the products of smelting which have been drawn off, into the furnace once again or over and over again, so that a repeated flow takes place, the said products being introduced at the particular place where their action is most favourable, i. e. at places where there is a lack of heat and the smelting operation is lagging.

For the purpose of increasing the effect of this repeated introduction physical or chemical modifications for instance, alterations of temperature, the use of solutions and so forth may be employed, but according to the present invention the principal effect arises from the fact that by means of the constant repetition of the operation of flowing through the bath, a continuously maintained velocity of flow through the furnace is obtained. In consequence of this the exchange of heat in all the parts of the furnace in which the flow takes place is intensified and the process is accelerated, as compared with the processes hitherto known in which the baths remained practically stationary.

I claim:

1. A process for the direct extraction of iron from its ores wherein an ore reducing mixture and an iron bath flow continuously in the same direction through a furnace, consisting in introducing an ore reduction mixture into an already flowing iron bath, causing a relative velocity of motion of said ore reduction mixture with regard to said iron bath to arise by the addition of further quantities of material, and increasing said relative velocity by causing the iron bath which is drawn off to flow repeatedly through the furnace.

2. A process for the direct extraction of iron from its ores of the kind in which an ore reducing mixture and an iron bath constituting together a charge flow continuously in the same direction through a furnace, consisting in first causing an iron bath to flow continuously through the furnace, then introducing an ore reduction mixture into said iron bath, thereupon causing a relative velocity of motion of said ore reduction mixture with regard to said iron bath to arise by increasing the quantity of said iron bath additively, and accelerating said relative velocity by the repeated introduction into the charge of quantities of the iron bath which have been drawn off.

3. A process for the direct extraction of iron from its ores wherein an ore reducing mixture and an iron bath flow continuously in the same direction through a furnace, consisting in introducing an ore reduction mixture into an already flowing iron bath, causing a relative velocity of motion of said ore reduction mixture with regard to said iron bath to arise by the addition of further quantities of material, and increasing said relative velocity by causing the iron bath which is drawn off to flow repeatedly through the furnace, the ore contained in a state of suspension in the reducing gas stream which will exist above the continuously flowing bath being likewise reduced above this latter.

Signed at Vienna, Austria, this 5th day of July, 1929.

ING. ARTHUR LANGER.